(12) United States Patent
Ripamonti et al.

(10) Patent No.: US 11,933,067 B2
(45) Date of Patent: Mar. 19, 2024

(54) SYSTEM FOR IDENTIFICATION AND ACTIVE CONTROL OF VIBRATIONS IN A STRUCTURE AND RELATING METHOD

(71) Applicant: ISAAC S.R.L., Milan (IT)

(72) Inventors: Francesco Ripamonti, Erba (IT); Alberto Bussini, Milan (IT)

(73) Assignee: ISAAC S.R.L., Milan (IT)

(*) Notice: Subject to any disclaimer, the term of this patent is extended or adjusted under 35 U.S.C. 154(b) by 638 days.

(21) Appl. No.: 17/256,507

(22) PCT Filed: Jul. 2, 2019

(86) PCT No.: PCT/EP2019/067671
§ 371 (c)(1),
(2) Date: Dec. 28, 2020

(87) PCT Pub. No.: WO2020/011591
PCT Pub. Date: Jan. 16, 2020

(65) Prior Publication Data
US 2021/0230896 A1    Jul. 29, 2021

(30) Foreign Application Priority Data

Jul. 13, 2018   (IT) .................. 102018000007173

(51) Int. Cl.
*E04H 9/02*    (2006.01)
*E04B 1/98*    (2006.01)
(Continued)

(52) U.S. Cl.
CPC ............ *E04H 9/0215* (2020.05); *E04B 1/98* (2013.01); *F16F 7/1005* (2013.01);
(Continued)

(58) Field of Classification Search
None
See application file for complete search history.

(56) References Cited

U.S. PATENT DOCUMENTS 9,587,699 B1   3/2017  Griffin et al.
2007/0068756 A1* 3/2007  Huston ................. F16F 7/1005
                                                       267/140.15
(Continued)

FOREIGN PATENT DOCUMENTS

ES    2 653 651 A1    2/2018
ES    2653651 A1 *    2/2018  ............. G01H 13/00
(Continued)

OTHER PUBLICATIONS

Ubertini et al., "Considerations on the Implementation and Modeling of an Active Mass Driver with Electric Torsional Servomotor," Mechanical Systems and Signal Processing, 58-59, (2015), pp. 53-69.
(Continued)

*Primary Examiner* — Joshua K Ihezie
(74) *Attorney, Agent, or Firm* — Akerman LLP

(57) ABSTRACT

The present invention relates to a system for identification and active control of vibrations (101) in a structure (103), comprising at least one inertial device (102) associable with the structure (103), comprising at least one movable mass (104) and configured for a first controlled movement of the at least one movable mass (104) in order to excite the structure (103); one or more movement sensors (201) configured for detecting vibrations of the structure (103); at least one processing device (202, 302) operatively connected to the one or more movement sensors (201) and to the least one inertial device (102), the at least one processing device (202, 302) being configured for: identifying a set of first parameters determinable by the one or more movement sensors (201) in response to environment-induced vibrations of the structure (103); identifying a set of second parameters determinable by the one or more movement sensors (201) in response to the first controlled movement of the at last one movable mass (104); calculating a dynamic model, wherein
(Continued)

the set of first and second parameters are made consistent taking into account the at least one movable mass (104); detecting threshold-exceeding vibrations of the structure (103) by the one or more movement sensors; controlling the at least one inertial device (102), wherein the at least one inertial device (102) is further configured for a second controlled movement of the at least one movable mass (104), based on the dynamic model. The present invention further relates to a respective method for identification and active control of vibrations in a structure.

14 Claims, 3 Drawing Sheets

(51) Int. Cl.
| | | |
|---|---|---|
| *F16F 7/10* | (2006.01) | |
| *G01M 5/00* | (2006.01) | |
| *G05B 13/04* | (2006.01) | |
| *G08B 21/18* | (2006.01) | |

(52) U.S. Cl.
CPC ........ *G01M 5/0066* (2013.01); *G01M 5/0075* (2013.01); *G05B 13/042* (2013.01); *G08B 21/182* (2013.01); *F16F 2222/08* (2013.01)

(56) References Cited

U.S. PATENT DOCUMENTS

| | | |
|---|---|---|
| 2012/0266547 A1 | 10/2012 | Shimoda et al. |
| 2017/0124249 A1 | 5/2017 | Yang et al. |

FOREIGN PATENT DOCUMENTS

| | | | |
|---|---|---|---|
| JP | 2009 092396 A | | 4/2009 |
| JP | 2009092396 A | * | 4/2009 |

OTHER PUBLICATIONS

Written Opinion of the International Searching Authority issued in connection with PCT/EP2019/067671.
International Search Report issued in connection with PCT/EP2019/067671.

* cited by examiner

SYSTEM FOR IDENTIFICATION AND ACTIVE CONTROL OF VIBRATIONS IN A STRUCTURE AND RELATING METHOD

CROSS-REFERENCE TO RELATED APPLICATIONS

This application is a national phase of PCT/EP2019/067671, filed Jul. 2, 2019, and claims priority to IT 102018000007173, filed Jul. 13, 2018, the entire contents of both of which are hereby incorporated by reference.

TECHNICAL FIELD

The present invention relates to a system for identification and active control of vibrations in a structure.

In particular, the present invention relates to a system which is able to detect and react in a controlled way to a dynamic stress which generates vibrations on the structure, which such a system is applied to.

The present invention further relates to a method for identification and control of vibrations by using an active-type control system.

In general, the present invention finds application in the field of control and suppression of vibrations, by detecting vibrations, which a civil structure is subjected to, both in ordinary conditions and in exceptional conditions, which are potentially damaging to the civil structure itself.

PRIOR ART

Any large or small-sized structure, which is located in a non-isolated environment is generally subjected to a plurality of stresses, which are both of the dynamic and of the static type in most of the real cases. Such dynamic stresses have the effect to generate an induced vibration which is more or less visibly identifiable on the structure itself.

This phenomenon results to be of particular relevance with the growing of the structure size in consideration of the different orders of magnitude of the involved masses.

Accordingly, the evaluation of dynamic vibrations in structures with considerable mass results to be of particular interest in particular in civil applications, which can be for example a residential building, a bridge, a hospital, etc. The dynamic vibration evaluation is clearly of equal interest in cases where the structure is not fixed in the space, but it moves, for example in nautical field in which a ship represents a structure which is also provided with a considerable size and mass.

In the case of civil applications, the dynamic stress phenomenon of bigger interest and greater importance is certainly the one connected to a seismic event, which is relevant especially because of direct involvement of the users who is occupying the structure. For this reason, the focus will be below on the civil structure anti-seismic design, which takes different types of systems in order to hinder the above-mentioned induced vibrations. It is clear that the example of anti-seismic design in civil structures is to be considered as a non-limitative application.

In fact, dynamic stresses and induced vibrations of lower intensity are also to be considered, which are due, for example, to the wind action, which is especially important for slender and deformable structures, or are due to the vehicular traffic, which is especially relevant for some structures, also based on the adopted materials.

A type of structural control provides the use of systems adapted to modify the structure response when it is subjected to dynamic stresses, so as to reduce vibrations thereof.

To-date-developed systems for structural control can be divided into three categories: passive, active and semi-active.

The passive systems for structural control do not require an external energy source to operate and use the same structure motion to produce a relative movement among the different parts of a device, so as to develop the control forces which will be a function only depending on the only motion of the structure. The passive systems for structural control reduce the oscillatory response of the structure through a constant and predetermined behaviour and therefore are not capable of simultaneous corrections upon occurrence of different stresses, namely, they are not able to interactively adapt thereto.

The passive systems for structural control may take advantage of, for example, inelastic deformation of metals (Metallic yield dampers), or a frictional dissipative force between bodies (Friction dampers), or a shear deformation by using viscoelastic materials (Viscoelastic dampers), or an auxiliary mass (Tuned mass dampers or TMD). In this latter case, there is actually a double mass-spring-damper system connected in a cascade fashion. A TMD type device can be set up for only one natural frequency of the structure.

Auxiliary mass or TMD system solutions have been proposed in the aeronautical field. For example, U.S. Pat. No. 9,587,699 B1 discloses a self-tunable TMD system, which adopts a moving coil to vary the length of flexible elements and which uses an iterative process to converge a transfer function calculated between current circulating in the moving coil and structure acceleration to an optimum value. The system known from U.S. Pat. No. 9,587,699 B1 results to be quite complex and not particularly suitable for civil applications.

A further known method for damping the oscillation amplitude of a platform is described in US 2017/0124249 A1, wherein an optimisation based on an equivalent simplified model is performed starting from initial parameters and by a predetermined motion function and by dynamic characteristics acquired by the platform. The method known from US 2017/0124249 A1 is not particularly suitable for cases where there is a sudden variation of the dynamic stress conditions on the structure, such as in the case of seismic events.

The active systems for structural control, known as Active Mass Dampers or AMD, and also the semi-active systems for structural control require an external energy source to be able to operate. The active devices need in fact electrohydraulic or electromechanical actuators which carry out control forces on the structure. The control forces are generated by the actuators, which are controlled by a control algorithm whose decisions are based on the feedback coming from the sensors, which measure the structure response, and/or on feedforward information coming from the excitation measurement.

For example, US 2012/0266547 A1 describes a system comprising a mass held movably in a plane direction and fixedly in the other direction by a frame and flexible bodies adopted as motion means and connected to the frame walls; such a system is actuated by a reversible electric motor connected to specific sensors which detect the stress on the structure. The system known from US 2012/0266547 A1 is not particularly accurate, in particular because of the uncertainty which the detection of the sensors suffers from, especially with a view to a detection of low intensity vibrations.

Furthermore, in general, the active systems for structural control or AMD are bound to the creation of a complex dynamic structure model to be performed by experienced installers.

In the article "*Considerations on the implementation and modelling of an active mass driver with electric torsional servomotor*" by F. Ubertini, I. Venanzi, G. Comanducci; *Mechanical Systems and Signal Processing* 58-59 (2015) 53-69, it is proposed to adapt a numerical model of a structure, which is provided with an active system for structural control or AMD based on experimental data. However, such a solution is scarcely efficient if the numerical model to be adapted is excessively far from the real structure model.

As it is possible to deduce from the above, the known systems, either passive, active or semi-active suffer from a series of drawbacks.

However, in particular, the active systems, although ensuring an enough precise response to the dynamic stress and to the detected vibrations, need a very accurate model in order to synthetize the control; thus, this modelling activity must be executed by skilled persons and is generally onerous and difficult to generalize, thus resulting in prohibitive costs and long realization times.

SUMMARY OF THE INVENTION

An object of the present invention is to solve the prior art drawbacks.

An object of the present invention is to ensure a better reliability of the data inserted in a system for active control in order to generate a correct response of a vibration-damping system.

A further object of the present invention is to perform a structural control analysis to detect potential damages inside a monitored structure.

A further object of the present invention is to perform a structural monitoring analysis to evaluate the evolution of the global condition of a structure over time.

A further object of the present invention is to provide a system with simple implementation which can be used by any user, even if not skilled.

Still a further object of the present invention is to provide a system which is also able to exploit the energy acquirable from a damping device in an alternative way.

These and other objects are achieved by a system for identification and active control of vibrations in a structure and by a method for identification and active control of vibrations in a structure according to the characteristics of the appended claims which form an integral part of the present description.

An idea underlying the present invention is a system for identification and active control of vibrations in a structure comprising at least one inertial device associable with the structure. The inertial device comprises at least one movable mass and is configured for a first controlled movement of the at least one movable mass, in order to excite the structure. The system for identification and active control further comprises one or more movement sensors configured for detecting vibrations of the structure. The system for identification and active control further comprises at least one processing device, operatively connected to the one or more movement sensors and to the at least one inertial device.

The at least one processing device is configured for:

identifying a set of first parameters, said first parameters being determinable by the one or more movement sensors in response to environment-induced vibrations of the structure;

identifying a set of second parameters, said second parameters being determinable by the one or more movement sensors in response to the first controlled movement of the at least one movable mass;

calculating a dynamic model, wherein the set of first parameters and the set of second parameters are made consistent taking in account the at least one movable mass;

detecting threshold-exceeding vibrations of the structure by the one or more movement sensors;

controlling the at least one inertial device, wherein the at least one inertial device is further configured for a second controlled movement of the at least one movable mass, based on the dynamic model.

Preferably, the processing device is configured for calculating the dynamic model by a statistical evaluation of subsequent sets of parameters. Advantageously, it is thus possible to make the calculated dynamic model more robust.

Preferably, the processing device is configured for a temporal evolution analysis of subsequent parameters of the dynamic model for structural health monitoring, performing a so-called "Structural Health Monitoring". Advantageously, it is also possible to evaluate the evolution of dynamic parameters relevant to the evaluation of maintenance services, which the structure should undergo.

Preferably, the processing device is configured for generating an alarm signal in the event of variation of the subsequent sets of parameters above an alarm threshold. It is thereby possible to have an instantaneous indication of the possible presence of a structural damage, in order to avoid incurring in irreversible drawbacks.

Preferably, the system of the present invention provides one or more environmental sensors configured for detecting at least one environmental parameter such as temperature and/or humidity, wherein the processing device is further configured for compensating the temporal evolution analysis based on the environmental parameters. Advantageously, it is thus possible to evaluate only the parameters which are useful to the structure analysis, after excluding temporary environmental conditions which do not permanently invalidate the characteristics of the structure itself.

According to a further aspect, the present invention relates to a method for identification and active control of vibrations in a structure, comprising:

associating at least one inertial device with the structure, the inertial device comprising at least one movable mass;

associating one or more movement sensors configured for detecting vibrations with the structure;

identifying a set of first parameters, determined by the one or more movement sensors in response to environment-induced vibrations of the structure;

exciting the structure by a first controlled movement of the at least one movable mass;

identifying a set of second parameters, determined by the one or more movement sensors in response to the first controlled movement of the at least one movable mass;

calculating a dynamic model wherein the set of first parameters and the set of second parameters are made consistent taking into account the at least one movable mass;

detecting threshold-exceeding vibrations of the structure by the one or more movement sensors;

performing the active control by a second controlled movement of the at least one movable mass, based on the dynamic model.

Further characteristics and advantages will become more apparent from the following detailed description of preferred non-limiting embodiments of the present invention, and from the dependent claims, which outline preferred and particularly advantageous embodiments of the invention.

BRIEF DESCRIPTION OF THE DRAWINGS

The invention is illustrated with reference to the following figures, provided by way of non-limiting example, wherein.

In the different figures, similar elements will be identified by similar reference numbers.

DETAILED DESCRIPTION

With reference to the figures, a system for identification and active control of vibrations in a structure realized according to the present invention is globally and schematically marked with 101, below simply called "system" 101.

Figure 1:
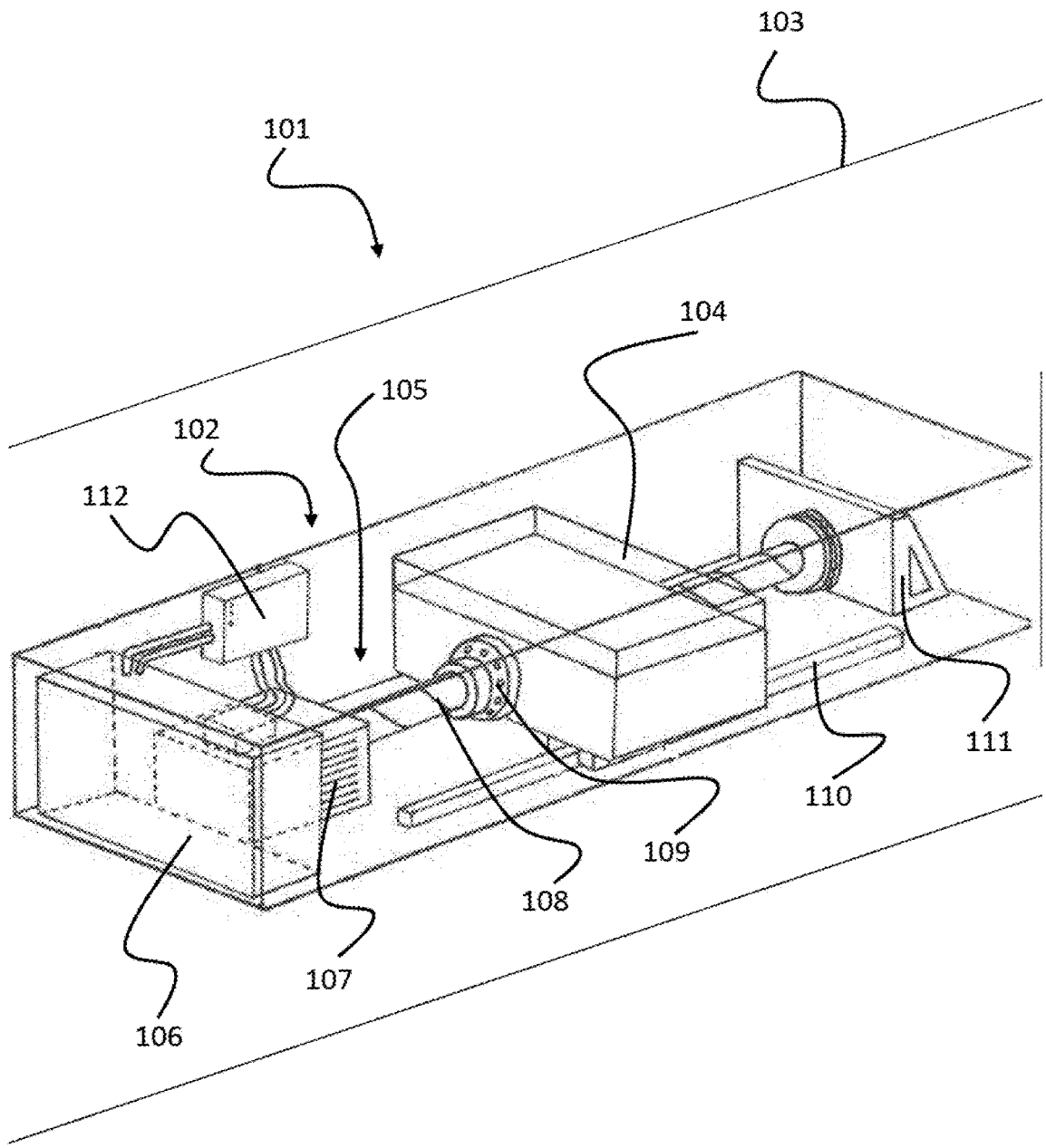
FIG. 1 illustrates a schematic perspective view of an inertial device associable with a structure and comprising at least one movable mass, in a system for identification and active control of vibrations according to the present invention.

The system 101, which is partially visible in FIG. 1, comprises at least one inertial device 102 associable with a structure 103. Such an inertial device 102 comprises a movable mass 104; in alternative embodiments, the inertial device may comprise a plurality of movable masses, which are movable also in directions different from each other.

The inertial device 102 is configured for exciting the structure 103 by a first controlled movement of the movable mass 104. For this purpose, the inertial device 102 comprises at least one motion device 105 configured for generating a controlled translational movement of the at least one movable mass 104. Accordingly, the inertial device 102 is configured for actuating an active control on the structure 103 by movements of the at least one movable mass 104. Such an active control allows firstly a compensation of vibrations of the structure 103 thus reducing the amplitude thereof and it also allows a determination of dynamic parameters of the structure, as it will be further described.

In the exemplary embodiment of FIG. 1, the motion device 105 of the system 101 comprises at least one power supply battery 106; alternatively or additionally, other types of power supply could be obviously adopted, for example a power supply of the type wired to the electric network. The power supply battery 106 supplies power to a servomotor 107, which drives a motion screw 108 passing through the movable mass 104 by means of a nut 109 integral with the movable mass 104. The movable mass 104 is thus configured for sliding on rails 110, which are longitudinal relative to the inertial device 102, under the action transmitted by the screw 108. The screw 108 is preferably a recirculating ball screw.

The screw 108 results to be comprised between the servomotor 107 and a frame structure 111 on which a thrust bearing is made integral 112. The movable mass 104 moves along the rails 110 between the servomotor 107 and the frame structure 111. The inertial device 102 is driven by a driver 112.

In an alternative embodiment, it could be possible to adopt a generic device with a screw-nut mechanism for the motion of the mass 104, or also to use pins instead of the screw, on which the movable mass 104 can be slid also by different mechanical, hydraulic and pneumatic actuators.

In another alternative embodiment, it can be again provided a different motion system which also provides, for example, a rotating motion of the movable mass.

Figure 2:
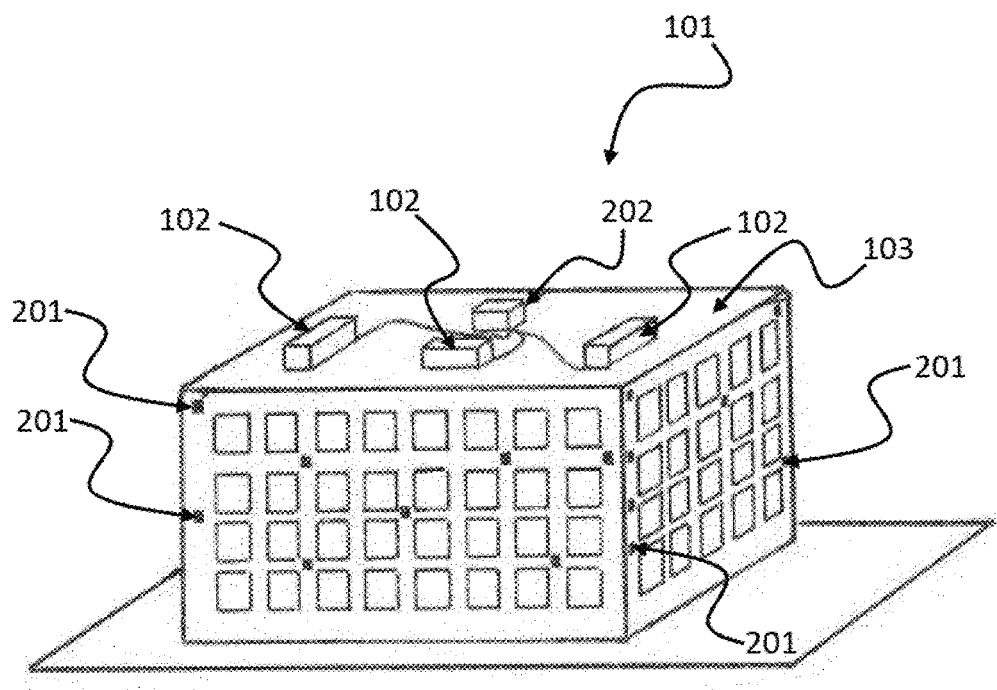
FIG. 2 illustrates an installation according to a first embodiment of a system for identification and active control of vibrations according to the present invention.

As visible in FIG. 2, the system 101 can comprise a plurality of inertial devices 102 associated with the structure 103. Preferably, such inertial devices 102 can be connected in parallel to each other or even be independent from each other, in order to increase the capability for detection of vibrations or in order to sector the detection. In particular, the inertial devices 102 can be arranged such that the movement directions of the respective masses are different from each other, in order to provide a more versatile and more accurate control.

The system 101 further comprises one or more movement sensors 201 configured for detecting vibrations of the structure 103.

Preferably, the one or more movement sensors 201 are accelerometers or vibrometers. The accelerometers can be of any type: extensimetric, piezoelectric, capacitive, LVDT or others.

Figure 3:
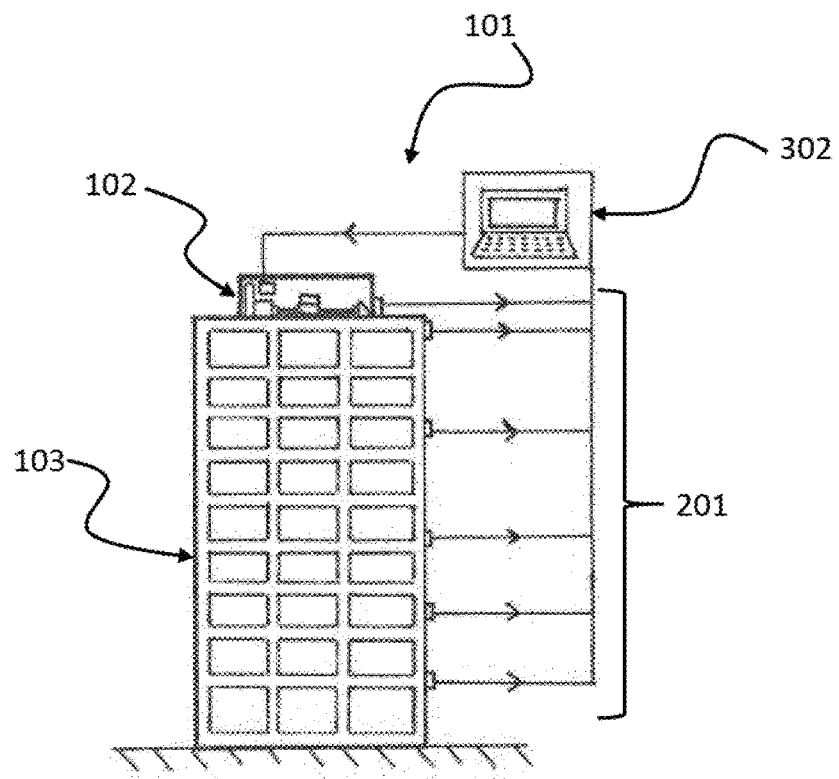
FIG. 3 illustrates an installation according to a second embodiment of a system for identification and active control of vibrations according to the present invention.

The one or more movement sensors 201 and the inertial device 102 are operatively connected to a processing device 202, which is preferably arranged close to the inertial devices 102. Otherwise, in FIG. 3, an alternative embodiment is visible, wherein a processing device 302 is remotely connected relative to the inertial devices 102 and the movement sensors 201. In fact, the connection between inertial devices 102 and processing device 202 or 302, can be performed in a wired way or in a wireless way, for example by Wi-Fi networks or by network connections operating over the telephone and/or Internet network.

Figure 4:
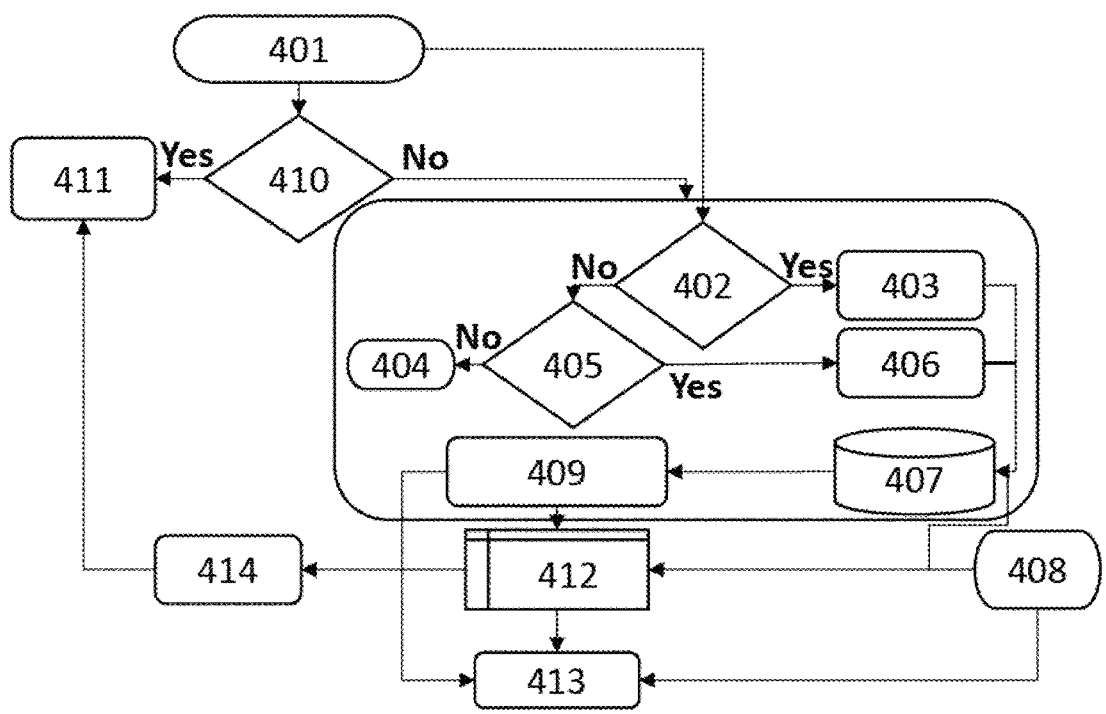
FIG. 4 illustrates a method for identification and active control of vibrations according to the present invention.

The processing device 202, 302, as visible in the flow-chart of FIG. 4, acquires the information coming from the one or more movement sensors 201 in a continuous way in a step 401.

If the detected value is higher than a control value in a step 402, the processing device 202, 302 is configured for identifying a set of first parameters in a step 403. The first parameters are thus determinable by the one or more movement sensors 201 in response to environment-induced vibrations of the structure 103.

If the value detected by the one or more movement sensors 201 is instead lower than a control value, as determined by a scheduled program in the step 405, the processing device 202, 302 can stop the process in an end step 404, in a first possibility.

Otherwise, in a second possibility, if it is so determined by the scheduled program of the step 405, the processing device 202, 302 activates the at least one movable mass 104 in a step 406, in order to perform a first controlled movement, such first controlled movement being detected by the one or more movement sensors 201.

The system 101 is thus able to identify a set of second parameters.

Thanks to the processing device 202, 302, the system 101 is configured for preferably automatically executing the identifying and the active control of vibrations.

The system 101 thus stores the set of first parameters and the set of second parameters in a step 407.

Preferably, such sets of first and second parameters are respectively determinable by algorithms of the "Operational Modal Analysis" and "Experimental Modal Analysis" types.

Furthermore, such sets of first parameters and sets of second parameters include one or more parameters of: at least one mass, at least one stiffness and at least one damping. Other parameters and magnitudes, which are significant from the point of view of the vibration of the structure 103, can be adopted.

The system 101 preferably comprises also one or more environmental sensors configured for detecting at least one environmental parameter, such as humidity and/or temperature, in a step 408; such environmental parameters are also stored together with the set of first parameters and the set of second parameters at the step 407.

The system 101 makes the set of first parameters and the set of second parameters consistent and calculates a dynamic model in a step 409, taking into account the at least one movable mass 104. Preferably, such dynamic model comprises peculiar frequencies of the structure 103.

Thanks to such dynamic model, the system 101 is able to detect threshold-exceeding vibrations of the structure 103 in a step 410 by the one or more movement sensors 201 so as to control, in a step 411, the at least one inertial device 102 with a second controlled movement of the at least one movable mass 104, based on the dynamic model.

Preferably, the set of first parameters and the set of second parameters are made consistent taking into account a parameter inversely proportional to the square root of the at least one movable mass 104. Further, it is possible to take into account the arrangement of the at least one movable mass 104 in the structure 103, making the set of first parameters and the set of second parameters consistent with a multiplier coefficient related to such an arrangement.

The system 101 is also configured in particular by the processing device 202, 302 for repeating over time the identifying of the set of first parameters at the step 406 and of the set of second parameters at step 407, thus acquiring subsequent sets of parameters.

The dynamic model is preferably calculated by a statistical evaluation of the subsequent sets of parameters at the step 409.

Furthermore, the subsequent sets of parameters, which are made consistent at the step 409, are stored in a step 412. The system 101 operates an encoding from the stored parameters at the step 412 in its own control parameters in a step 414 to have an immediate conversion in active control of the structure 103.

The system 101 is further configured in particular by the processing device 202, 302 for performing a temporal evolution analysis of the subsequent parameters of the dynamic model in a step 413, for performing a structural health monitoring, also called "Structural Health Monitoring" (SHM).

In the temporal evolution analysis of the parameters, the processing device 202, 302 is further configured for performing a compensation based on the environmental parameters detected at the step 408, where the above described one or more environmental sensors are provided.

If a variation of the subsequent sets of parameters above an alarm threshold is detected at the step 413, the processing device 202, 302 is further configured for generating an alarm signal.

A method for identification and active control of vibrations according to the invention is described below. It is to be understood that the described and claimed steps can also be performed in different orders; in particular, the presence of "first parameters" and of "second parameters" is purely indicative and is not to be understood as a temporal limitation on their realization.

The method for identification and active control of vibrations in a structure comprises associating at least one inertial device 102 with the structure 103, the inertial device comprising at least one movable mass 104. The inertial device 102 can be arranged according to the needs and it is also likewise possible to arrange a plurality of inertial devices 102.

One or more movement sensors 201 configured for detecting vibrations are associated with the structure 103. A set of first parameters, which are determined by the one or more movement sensors 201 in response to environment-induced vibrations of the structure 103, is identified based on the detected vibrations.

The structure 103 is excited by a first controlled movement of the at least one movable mass 104. A set of second parameters, which is determined by the one or more movement sensors 201 in response to the first controlled movement of the at least one movable mass 104, is thus identified.

The set of first parameters and the set of second parameters are made consistent taking into account at least one movable mass 104, thus calculating a dynamic model.

Accordingly, the method performs the active control by a second controlled movement of the at least one movable mass 104, based on the dynamic model, in the event of detection of threshold-exceeding external vibrations of the structure 103 by the one or more movement sensors 201.

In general, the method for identification and active control of vibrations of a structure according to the present invention is implementable in the system 101 for identification and active control of vibrations of a structure according to the present invention. The characteristics of the system are thus also to be referred to the method, as described herein.

INDUSTRIAL APPLICABILITY

Advantageously, the present invention allows identifying a dynamic robust model relating to the vibrations of a structure, with a lower uncertainty on the parameters used for the construction of such a model.

In fact, the system and the method of the present invention provide making two different data, which are both closely linked to the structure and are not purely numerical, consistent by means of a purification from the mass influence. The dynamic model is advantageously precise particularly by means of a statistical evaluation, which is able to identify the most reliable parameter based on the behaviour expected from the specific structure.

Furthermore, the present invention is optimal in the evaluation of the dragging action on the movable mass. In fact, the processing device is adapted to calculate necessary control forces in the various directions, in order to decrease the oscillation amplitudes of the structure during a vibratory event. Each inertial device installed on the structure receives a control force command to be singularly carried out in the point in which the specific inertial device is applied. The acceleration of the structure in the same direction and in the same application point of a single inertial device, which is also called "dragging acceleration", and the relative acceleration of the inertial mass relative to the application point on the structure, which is also called "relative acceleration", allow to define a control force based on the dynamic behaviour of the structure, thus avoiding any type of "Spillover" phenomena which could degrade the performances of the structure during the vibratory event, in particular of the seismic type.

Among the applications of the present invention, it is also possible to consider the energy recovery. In fact, it is possible to recover the energy of the consequent vibration by exploiting the relative mass-structure movement in environmental stress condition. Such a recovered energy can be used in an ideal condition to re-supply the system without the need of an additional power-supply source.

Further advantage of the present invention is provided by the evolution analysis over time of the structure for the purposes of a "Structural Health Monitoring", even compensating the negligible influences of humidity, temperature, and so on, being also able to perform a predictive analysis of possible damages in appropriate conditions, thus evaluating a consequent preventive maintenance on the monitored structure.

Still another advantage of the present invention is provided by the applicability of the system on any structure and in any arrangement, since it is not bounded to specific installation requests.

Finally, a further advantage of the system according to the present invention is provided by the possibility to be installed by any user, since it does not need any ad-hoc complex programming by a skilled person but is adapted to self-configuring for immediate operation. This has a significant impact both from a practical point of view and from an economical point of view.

Considering the description herein reported, the skilled person will be able to conceive further modifications and variations, in order to meet contingent and specific needs.

The embodiments herein described are therefore to be considered as illustrative and non-limiting examples of the invention.

What is claimed is:

1. A system for identification and active control of vibrations in a structure, comprising:
   at least one inertial device associable with said structure, said inertial device comprising at least one movable mass and configured for a first controlled movement of said at least one movable mass, in order to excite said structure;
   one or more movement sensors configured for detecting vibrations of said structure;
   at least one processing device operatively connected to said one or more movement sensors and to said at least one inertial device, said at least one processing device being configured for:
      identifying a set of first parameters, said first parameters being determinable by said one or more movement sensors in response to environment-induced vibrations of said structure, wherein said set of first parameters includes at least one mass, and at least one stiffness, and at least one damping;
      identifying a set of second parameters, said second parameters being determinable by said one or more movement sensors in response to said first controlled movement of said at least one movable mass, wherein said set of second parameters includes at least one mass, and at least one stiffness, and at least one damping;
      calculating a dynamic model wherein said set of first parameters and said set of second parameters are made consistent taking into account said at least one movable mass;
      detecting threshold-exceeding vibrations of said structure by said one or more movement sensors;
      controlling said at least one inertial device, wherein said at least one inertial device is further configured for a second controlled movement of said at least one movable mass, based on said dynamic model.

2. The system according to claim 1, wherein said first parameters are determinable by Operational Modal Analysis algorithms and wherein said second parameters are determinable by Experimental Modal Analysis algorithms.

3. The system according to claim 1, wherein said set of first parameters and said set of second parameters are made consistent considering a parameter inversely proportional to the square root of said at least one movable mass.

4. The system according to claim 3, wherein said set of first parameters and said set of second parameters are made consistent further considering a multiplier coefficient related to the arrangement of said at least one movable mass within said structure.

5. The system according to claim 1, wherein said processing device is further configured for repeating over time the identifying of said set of first parameters and of said set of second parameters, acquiring subsequent sets of parameters.

6. The system according to claim 5, wherein said processing device is further configured for calculating said dynamic model by a statistical evaluation of said subsequent sets of parameters.

7. The system according to claim 5, wherein said processing device is further configured for a temporal evolution analysis of said subsequent sets of parameters, for structural health monitoring.

8. The system according to claim 7, wherein said processing device is further configured for generating an alarm signal in the event of variation of said subsequent sets of parameters above an alarm threshold.

9. The system according to claim 7, further comprising one or more environmental sensors configured for detecting at least one environmental parameter including at least temperature and/or at least humidity, wherein said processing device is further configured for compensating said temporal evolution analysis based on said environmental parameters.

10. The system according to claim 1, wherein said at least one inertial device comprises at least one motion device configured for a controlled translational movement of said at least one movable mass.

11. The system according to claim 1, wherein said at least one inertial device is configured for said active control, by movements of said at least one movable mass, to compensate vibrations of said structure, reducing an amplitude thereof.

12. The system according to claim 1, configured for automatically executing said identification and said active control of vibrations.

13. A method for identification and active control of vibrations in a structure, comprising:
   associating at least one inertial device with said structure, said inertial device comprising at least one movable mass;

associating one or more movement sensors configured for detecting vibrations with said structure;

identifying a set of first parameters, determined by said one or more movement sensors in response to environment-induced vibrations of said structure, wherein said set of first parameters includes at least one mass, and at least one stiffness, and at least one damping;

exciting said structure by a first controlled movement of said at least one movable mass;

identifying a set of second parameters, determined by said one or more movement sensors in response to said first controlled movement of said at least one movable mass, wherein said set of second parameters includes at least one mass, and at least one stiffness, and at least one damping;

calculating a dynamic model wherein said set of first parameters and said set of second parameters are made consistent taking into account said at least one movable mass;

detecting threshold-exceeding vibrations of said structure by said one or more movement sensors;

performing said active control by a second controlled movement of said at least one movable mass, based on said dynamic model.

14. The method according to claim 13, implementable in an identification and vibrations active control system within a structure.

* * * * *